B. A. PROCTOR.
MOVING PICTURE MACHINE.
APPLICATION FILED JUNE 21, 1917.
1,298,393.
Patented Mar. 25, 1919.
2 SHEETS—SHEET 1.
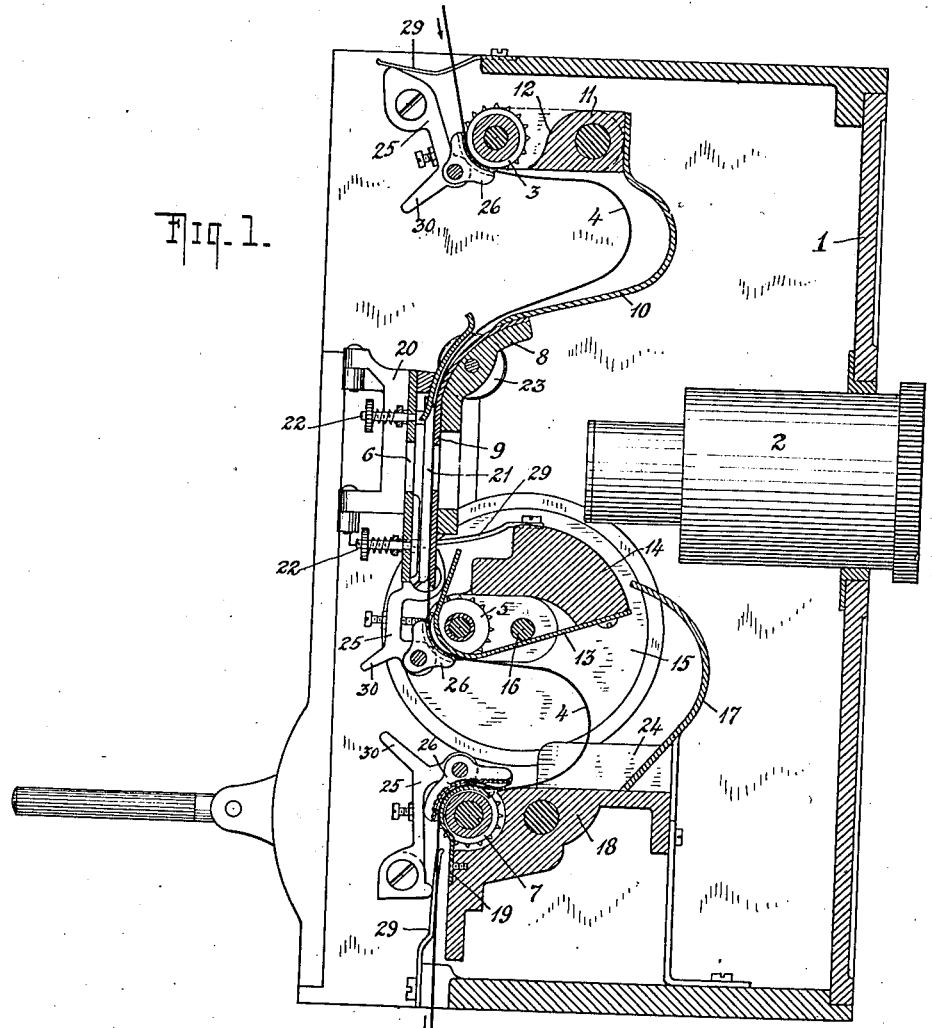
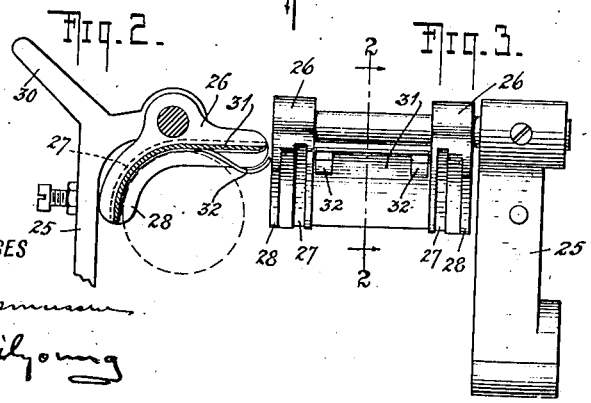
WITNESSES
INVENTOR
BARTON A. PROCTOR
BY
ATTORNEYS B. A. PROCTOR.
MOVING PICTURE MACHINE.
APPLICATION FILED JUNE 21, 1917.
1,298,393.
Patented Mar. 25, 1919.
2 SHEETS—SHEET 2.
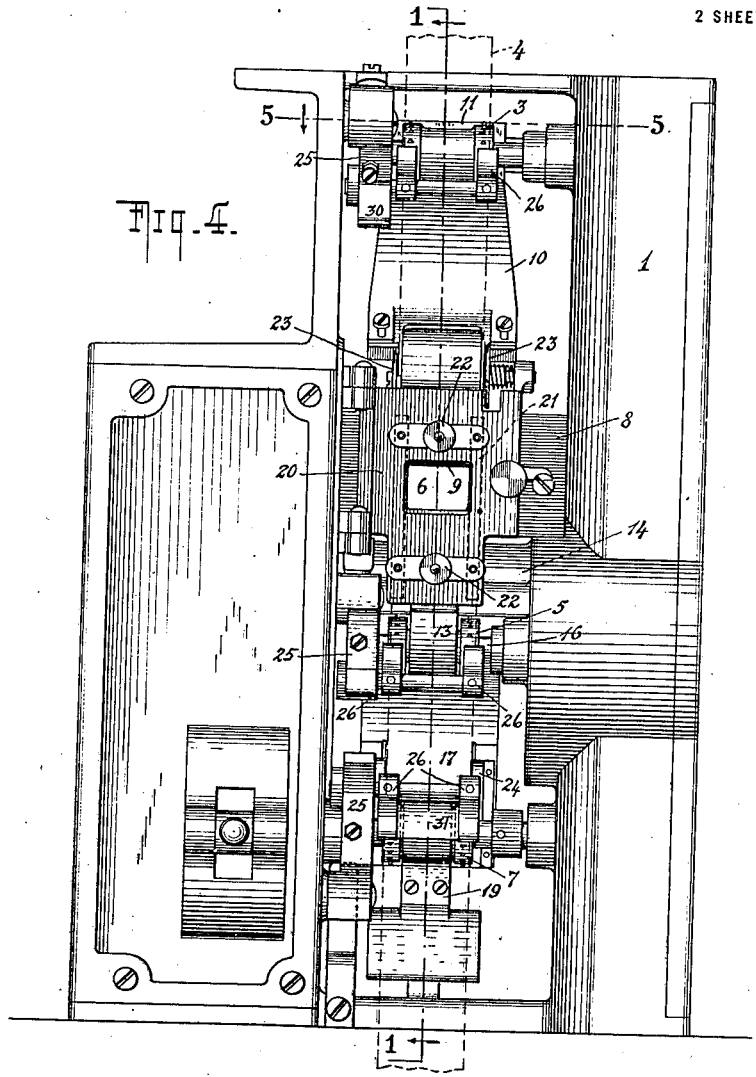
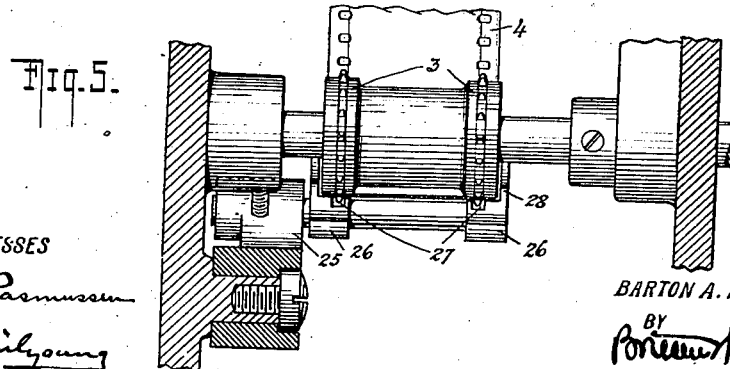
WITNESSES
INVENTOR
BARTON A. PROCTOR
BY
ATTORNEYS

UNITED STATES PATENT OFFICE.

BARTON A. PROCTOR, OF BRIDGETON, NEW JERSEY, ASSIGNOR TO KINOIKON APPARATUS CORPORATION, OF BRIDGETON, NEW JERSEY, A CORPORATION OF DELAWARE.

MOVING-PICTURE MACHINE.

1,298,393.      Specification of Letters Patent.      Patented Mar. 25, 1919.

Application filed June 21, 1917. Serial No. 176,053.

*To all whom it may concern:*

Be it known that I, BARTON A. PROCTOR, a citizen of the United States, residing at Bridgeton, Cumberland county, New Jersey, have invented certain new and useful Improvements in Moving-Picture Machines, of which the following is a specification.

My invention relates to projectors and cameras for moving pictures and, more particularly, to such apparatus when arranged for use in connection with pictures which are disposed one after the other on long continuous strips of film, as is common in the art.

My invention is of special importance in connection with moving picture projectors where the same identical reel or strip of film must be put through the machine again and again.

Under such conditions, the perforations with which the margins of the films are now universally provided for engagement with the sprocket teeth and by means of which the film is pulled or fed through the machine, soon tend to become enlarged or torn out and the margins split and frayed, thus interfering with the smooth, continuous and uniform operation of the machine and resulting in numerous breaks and stoppages.

It is the object of my invention, now to be described, to provide an arrangement and construction of parts such that the strain upon the perforations and upon the margins, and the damage resulting therefrom, will be greatly lessened thereby correspondingly increasing the useful life of individual films as well as enabling them to be exhibited with fewer interruptions and with less attention on the part of the operator.

It is a further object of my invention to so arrange and guide the film in and through the machine that, should breakage of the film take place, it cannot become entangled with the mechanism so as to receive further damage thereby, but, on the contrary, will be confined to a part of the mechanism housing where it can not only suffer no further injury, but will also be very accessible for purposes of replacement or repair.

Briefly described my invention comprises providing a substantially continuous track for the film between the points where the film leaves the film supply reel to the point where it enters the take-up reel and in equipping this track with any necessary lateral guides to keep the film in proper alinement. The usual sprockets for feeding the film are arranged so as to constitute part of the track. The invention also includes special means for keeping the film perforations pressed down to the bottoms of the sprocket teeth so that they cannot rise thereupon as well as for effecting this result over a very considerable arc of the sprocket heads.

The invention resides in the special arrangement, construction and combination of parts as will be hereinafter described.

My invention will be better understood by referring to the accompanying drawings in which Figure 1 represents a side elevation, largely in section, showing the film mechanism of a projector with the improvements of my invention applied thereto, the section being taken along the line 1—1 of Fig. 4. Figs. 2 and 3 represent detail views, on an enlarged scale, of the combined sprocket shoe and tension device adjacent to the take-up reel (not shown), Fig. 2 being a section along the line 2—2 of Fig. 3, and Fig. 3 being an elevation taken from the front of the machine (right of Fig. 2); Fig. 4 is a rear elevation (taken from the left) of the structure shown in section in Fig. 1; and Fig. 5 is a plan view, part section, taken along the line 5—5 of Fig. 4, showing the upper sprocket and associated parts on an enlarged scale.

Referring to the accompanying drawings, the housing 1 has a suitable projecting lens 2 mounted in the front wall thereof, and contains the film display mechanism. This includes a continuously driven upper sprocket 3 which draws the film 4 from the film supply reel (not shown) mounted above the housing, the intermittently driven sprocket 5 which places the consecutive pictures of the film in front of the aperture 6 in suitable timed sequence, and the lower continuously driven sprocket 7 which feeds the film downwardly at its lower end and permits it to be easily drawn from the housing by the take-up reel (not shown) mounted below the housing. These several sprockets are driven in the usual way by suitable mechanism (not shown).

As is usual in projectors of the character herein shown, the film is so mounted upon or engaged with the sprockets and the rotational speeds of the sprockets are so determined, that a permanent loop is formed in the film between the aperture 6 and the upper and lower sprockets 3 and 7 respectively.

A bracket 8, extending transversely across the housing, carries a track plate 9 having a central aperture which is in line with the aperture 6 as well as with a suitable aperture formed in the bracket. This track plate, below its aperture, extends very nearly to the intermittent sprocket 5 and its rear surface is substantially tangent to the rim surfaces of the heads of said sprocket, while the upper portion of the track plate is curved forwardly and smoothly joined to an upper track section 10 whose upper end terminates in a block 11 just behind the upper sprocket 3. The lower portion of rear face 12 of said block is given a curvature like, and brought very close to, sprocket 3; thus the block serves as a guard to prevent the film from ever being thrown upwardly by and wrapped around the sprocket.

An intermediate track section 13 has one end just in front of the bottom of track plate 9, curves rearwardly and downwardly around the spindle of the intermittent sprocket 5 between the cheeks thereof, and has its other end attached to a block 14 carried by a gear case 15 rotatable about a central axis 16. A lower track section 17 has its upper end located adjacent to the forward end of intermediate track section 13 and is curved forwardly and downwardly so that its lower end merges with a block 18 whose upper surface extends substantially to the lower sprocket 7 with the rim surfaces of whose sprockets said surface is tangent.

A stripper plate 19 is also attached to block 18 and is extended upwardly and forwardly around the sprocket between its cheeks.

The upper sprocket 3, the track section 10 and track plate 9 uniting this sprocket to the intermittent sprocket 5, the intermediate track section 13 uniting intermittent sprocket 5 to lower track section 17, the block 18 and the lower sprocket 7 with its stripper plate 19, constitute in effect a continuous track for the film through the housing 1.

The film gate 20, hinged as usual, is provided on its forward face with elongated shoes 21 which press lightly, by reason of springs 22, against the margins of film 4 as it passes over track plate 9.

Rotatably mounted guide disks 23 are fixed on each side of the upper end of track plate 9, and, being spaced apart so as to just include the film between them, keep said film in alinement with the aperture 6.

Fixed to block 18, one at each side of track section 17, are plates 24 which, like disks 23 above, keep the film in alinement and insure that its marginal perforations shall accurately aline themselves with teeth of sprocket 7.

Pivotally mounted on the housing 1, and on the gear box 15, adjacent to the upper sprocket 3 and intermittent sprocket 5 respectively, are arms 25 having pins upon which are mounted pairs of shoes 26 having faces curved to correspond with and embrace about (preferably) thirty degrees of arc on each cheek or head of the sprocket. A somewhat similar shoe device is provided for the lower sprocket 7. Each shoe is provided with a groove 27 which registers with and is sufficiently deep to clear the sprocket teeth, the shoe on each side of the groove resting on the rim of the sprocket wheel, and an outer flange 28 which extends radially inward of the rim of each sprocket cheek so as to overlap the same, the flanges thereby constituting lateral guides which keep the film accurately alined. Leaf springs 29 are so disposed with relation to the outer ends of arms 25 that said arms will either be pressed inwardly with the shoes against the sprockets, as shown in the drawings, or outwardly with the shoes well clear of the sprockets, as the case may be. Finger-pieces 30 are attached to the arms 25 for the purpose of throwing the shoes out of contact with the cheeks when it is desired to get at the film for the purposes of exchange, repair or otherwise.

The guide shoe device which coöperates with the lower sprocket 7 differs from the shoes coöperating with the other sprockets, as just described, in that its two shoes are joined by a web 31 which lies closely adjacent to the rear surface of the film; and in the further respect that the combined arrangement of shoes and web has a forward extension parallel with the upper surface of block 18 which is provided with laterally positioned short springs 32 which press the edges of the film gently against the upper surface of said block 18.

The rotatable gear box 15, besides carrying block 14, also carries the intermittent sprocket wheel 5 and arm 25 with its attached shoes 26. The purpose of thus making the gear box rotatable is to provide for the proper "framing" of the film, but this feature has nothing to do with my present invention. It is sufficient to say that, within the limits of rotation of the gear box, the two ends of track section 13 do not greatly change their positions with reference to the guiding surfaces of track plate 9 and track section 17, so that the continuity of the film track as a whole through the housing may be considered as practically unaffected.

In the operation of the invention, the gate 20 is opened and the arms 25, carrying shoes 26, are thrown outwardly away from the sprockets by means of finger-pieces 30. The film is then threaded into position and over the sprocket teeth in the usual way, a suitable amount of the slack being left above and below the film gate to constitute the required loops. The shoes are then thrown back into place and the gate closed. The mechanism can then be started and the film will be fed through the housing in front of the aperture.

As is well known, both the upper and lower loops are usually, during the operation of the machine, vibrating up and down very rapidly and violently. Where there is no continuous track for the film and where the film is held against the rims of the sprocket heads merely by the contact of a roller, as is usually the case, the marginal perforations are very apt to be thrown partially or entirely off the sprocket teeth with the result that the film will slip with respect to the teeth so as to either enlarge the perforations or sometimes punch new ones through the film. This is not only very destructive of the film, but also requires that the operator be constantly on the watch lest the film get out of "frame". Furthermore, since in this usual case the pull of each sprocket wheel is exerted upon the film only through one or two teeth at the most, the perforations are very likely to be torn out of the film altogether.

These disadvantages are avoided by the continuous track and the curved shoes of wide arc which compel the engagement of a very considerable number of teeth of each sprocket with the film.

As is well known, in machines of the character herein described, it is always necessary that the take-up reel be so arranged that the portion of the film lying between the take-up reel and the lower sprocket 7 is in a constant state of tension. Owing to the presence of the lower loop immediately above the lower sprocket, the film on this upper side of the sprocket is loose and has a certain tendency to ride to the top of the teeth and get out of registry therewith. By reason of the forward extension on shoes 26 and on the connecting webs which belong to the lower sprocket, and of the attached springs which press the film forwardly of the sprocket against the top surface of block 18, it is obvious that the film tends to be held back just before it reaches the lower sprocket and that, as a result, the film is stretched tightly at all times over this sprocket.

Variations of detail may, of course, be made within the spirit of the invention and the scope of the following claim.

In a moving picture machine, a sprocket wheel having a head provided with teeth to engage the film, a curved shoe shaped to fit a substantial portion of the periphery of said head and provided with an extension having a pressure spring, a spring for pressing the shoe against the film and a track ending adjacent the sprocket wheel under the pressure spring.

In testimony whereof I have hereunto set my hand.

Dated New York, N. Y. this 15th day of June, 1917.

BARTON A. PROCTOR.